United States Patent [19]
Mondiny

[11] Patent Number: 5,271,834
[45] Date of Patent: Dec. 21, 1993

[54] APPARATUS FOR THE MAGNETIC TREATMENT OF A FLUID

[75] Inventor: Pierre Mondiny, Langendorf, Switzerland

[73] Assignee: Alice Isola, Genua, Italy

[21] Appl. No.: 724,501

[22] Filed: Jun. 28, 1991

Related U.S. Application Data

[63] Continuation of Ser. No. 497,028, Mar. 22, 1990, abandoned.

[30] Foreign Application Priority Data

Mar. 30, 1989 [CH] Switzerland .......................... 1154/89

[51] Int. Cl.⁵ .............................................. C02F 1/48
[52] U.S. Cl. ........................................... 210/222; 96/1
[58] Field of Search ..................... 210/222, 223, 695; 55/3, 100; 209/232

[56] References Cited

U.S. PATENT DOCUMENTS

| | | | |
|---|---|---|---|
| 2,583,522 | 1/1952 | Winslow et al. | 210/223 |
| 4,153,559 | 5/1979 | Sanderson | 210/222 |
| 4,299,700 | 11/1981 | Sanderson | 210/222 |
| 4,357,237 | 11/1982 | Sanderson | 55/100 |
| 4,772,387 | 9/1988 | Simoni | 210/132 |
| 4,954,263 | 9/1990 | Woodhouse | 210/695 |

FOREIGN PATENT DOCUMENTS

| | | |
|---|---|---|
| 0057500 | 11/1982 | European Pat. Off. . |
| 0649441 | 4/1979 | U.S.S.R. . |
| 2128414 | 4/1984 | United Kingdom . |

*Primary Examiner*—Matthew O. Savage
*Attorney, Agent, or Firm*—Wegner, Cantor, Mueller & Player

[57] ABSTRACT

The apparatus comprises an essentially tubular jacket (1) and a magnet arrangement (5) which contains bar-shaped magnets (7). These magnets (7) are arranged in the inside of the jacket (1) in such a way that there is a gap (6) with a virtually annular cross-section between the inside of the jacket and the outside of the magnet arrangement. Furthermore, the apparatus comprises end-piece (2) which are assigned to the ends of the jacket (1) and the magnet arrangement (5) and via which the apparatus can be connected to a piping network. Each end-piece (2) has a central cavity (3) and channels (35) are provided which connect the cavity (3) to the gap (6) in terms of flow. These connection channels (35) are constructed and arranged in such a way that the fluid channels which pass through the connection channels into the gap (6) at least partially have the shape of a helix, and that a section of each channel is situated between sections of at least one second channel.

20 Claims, 8 Drawing Sheets

APPARATUS FOR THE MAGNETIC TREATMENT OF A FLUID

This application is a continuation of U.S. application Ser. No. 07/497,028 filed Mar. 22, 1990, now abandoned.

The present invention relates to an apparatus for the magnetic treatment of a fluid, in particular of water, having an essentially tubular jacket, and a magnet arrangement, which contains at least one bar-shaped magnet and which is arranged in the inside of the jacket in such a way that there is a gap between the inside of the jacket and the outside of the magnet arrangement, and having end-pieces, which are assigned to the ends of the jacket and the magnet arrangement and via which the apparatus can be connected to a piping network, each end-piece having a central cavity, and having at least two channels, which connect the central cavity to the gap in terms of flow.

An apparatus of this generic type is already known and it has two connection channels. These connection channels are situated close to each other, one of these channels partially overlapping the other. Since the waterchannels which are formed in the gap by such connection channels extend closely adjacently and since they also have different angles in relation to the inner wall of the gap, turbulences occur in the water which moves through the gap along the apparatus, which turbulences disturb the laminar flow of the said water.

The object of the present invention is to specify an apparatus of the generic type mentioned which does not have this disadvantage and which, additionally, offers further advantages.

With the apparatus of the generic type mentioned at the beginning this object is achieved according to the invention as is defined in the characterizing part of claim 1.

Exemplary embodiments of the present apparatus are explained in greater detail below with reference to the attached drawings, in which.

Figure 1:
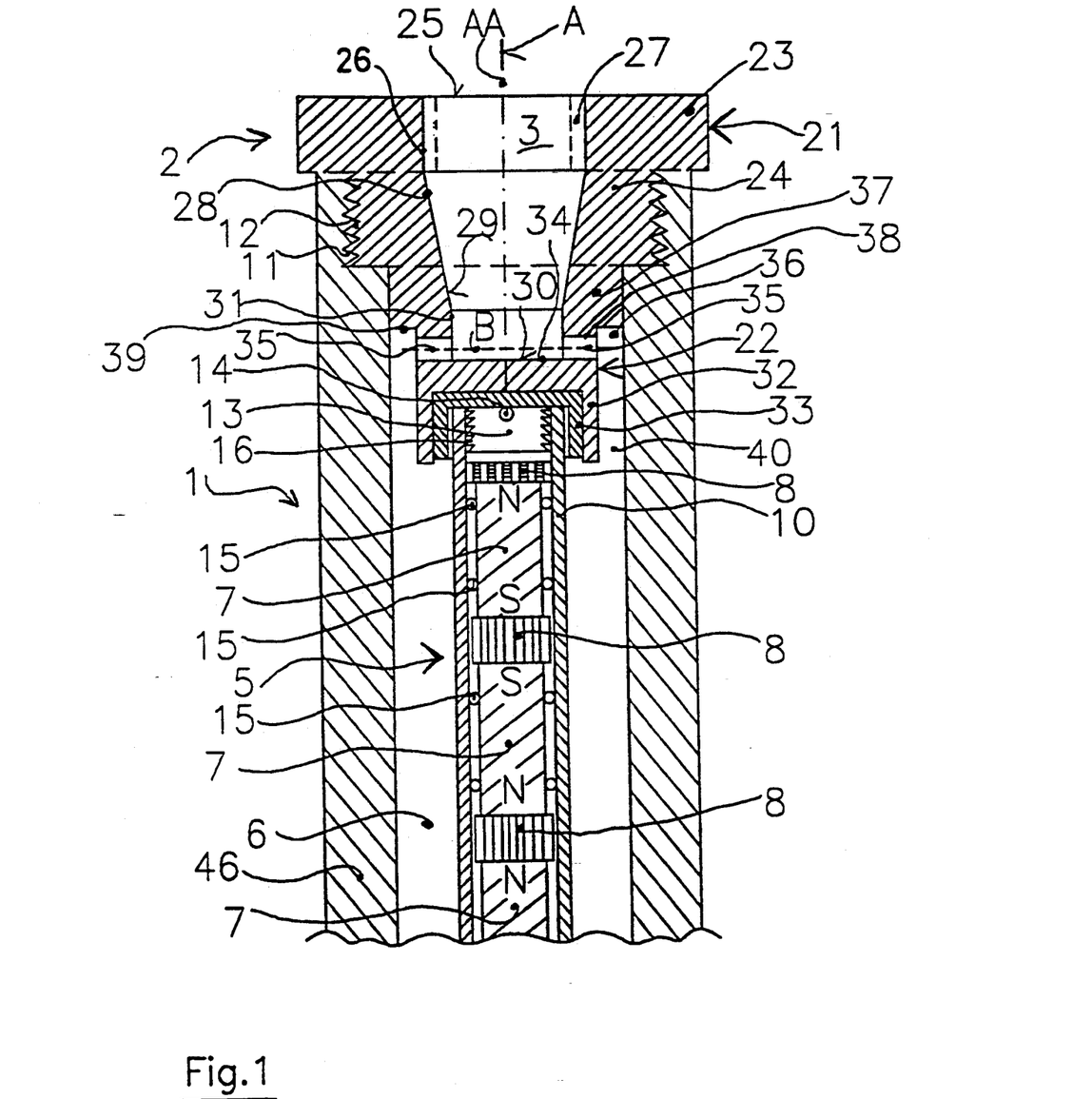
FIG. 1 shows a longitudinal section of a first example of the present apparatus.

The apparatus according to FIG. 1 has a jacket 1 which is virtually tubular. This jacket is constructed as a piece of pipe 46 which is made of a soft magnetic material. As an example of such material, stainless steel could be used. However, even in this case, the inside of the jacket pipe 46 is advantageously provided with a protective coating which protects the jacket 1 from rust attack. Materials for such protective coatings are generally known and Berlacryl made by Messrs. Berlac AG can be mentioned as an example of such material.

Situated at each end of the jacket 1 is an end-piece 2 which can be connected to the relevant end part of the piece of pipe 1, closing the latter off. In the example illustrated, the inside of the piece of pipe 2 is provided with a thread 11 and the outside of the end-piece 2 with a corresponding thread 12. The end-piece 2 can consequently be screwed into the end part of the piece of pipe 1. The end-pieces 2, which are screwed onto the ends of the piece of pipe 1, can be constructed identically. Constructed in the end-piece 2 is a central cavity 3 in which one of the pipes of an external piping system, e.g. of a domestic installation (not illustrated), can be fixed. By means of such pipes, the fluid, for example water, is passed to the apparatus and led off from the said apparatus.

Situated in the inside of the jacket 1, which is closed at both ends by the end-piece 2, is a magnet arrangement 5. This arrangement 5 is essentially bar-shaped, and the longitudinal axis of the latter virtually coincides with the inner section of the longitudinal axis of the jacket 1. The magnet arrangement 5 is consequently arranged virtually coaxially in the jacket 1 and, between the inside of the jacket 1 and the outside of the magnet arrangement 5, there is a gap 6, the cross-section of which is annular.

In the example illustrated, the magnet arrangement 5 contains short bar magnets 7 which are constructed in such a way that the respective S pole or N pole is situated in one of the end parts of the bar 7. The magnets 7 are arranged in such a way that the longitudinal axes of the said magnets are flush with one another such that the magnets 7 of the magnet arrangement 5 form a bar. In this bar, the magnets 7 are oriented in such a way that the poles of the same designation of adjacent magnets 7 are facing each other. Situated between the adjacent magnets 7 is an insert 8 in each case. These inserts 8 have the shape of short cylinders and they can be made, for example of iron or even of plastic.

Furthermore, the magnet arrangement 5 is surrounded by a tubular housing 10 in which the permanent magnets 7 and inserts 8, which are arranged successively and alternately, are accommodated. In the region of at least one of its end parts, the inner wall of the housing pipe 10 is provided with a thread in which a plug 13 is screwed. If only one end screw 13 is used, the other end of the housing pipe 10 can be closed off with a fixedly mounted base (not illustrated). The plug 13 is constructed as a stud screw (grub screw), the stud of the latter being provided with a slit 14 for the insertion of a screwdriver (not illustrated). One of the inserts 8 is also situated between the last one of the permanent magnets 7 and the end face of the end screw 13 lying in the inside of the housing 10.

The diameter of the inserts 8 or intermediate layers is selected such that they are fitted in the housing pipe 10 without play. In contrast, the diameter of the magnets 7 is slightly smaller than the inside diameter of the housing pipe 10 and spacer rings 15 made of a resilient material are situated in the gap which is present between the outside of the magnet 7 and the. inside of the jacket pipe 10. Instead of the spacer rings 15, the magnets 7 can be provided with a sleeve, advantageously made of a plastic, which cover at least the cylindrical wall of the respective magnet 7. However, the magnet 7 can also be surrounded on all sides by a housing of this kind. With a construction of the magnets 7 of this kind, the inserts 8 between the magnets 7 can possibly be omitted.

The end-piece 2 has an outer section 21 and an inner section 22. The outer section 21 of the end-piece is designed for connection of the apparatus to a piping network and for interaction with the jacket pipe 1. The inner section 22 of the end-piece is designed for interaction with the magnet arrangement 5 and for introduction of the fluid channels into the gap 6 or for guiding the treated fluid from the gap 6.

The end-piece 2 is advantageously made of brass. The outer edge part 23 of the outer section 21 of the end-piece is designed as a nut, advantageously as a hexagonal nut. This facilitates inter alia the assembly of the apparatus. The outer wall of the central part 24 of the section 21 adjoining the said outer edge part 23 is set back in respect of the outer wall of the outer edge part 23 against the longitudinal axis A of the apparatus such that the central part 24 is narrower than the outer part 23. The outer wall of the central part 24 is provided at the outer section 21 of the end-piece with the thread 12, already mentioned, which enables the end-piece 2 to be screwed into the jacket pipe 1.

Constructed in the outer section 21 of the end-piece is a central opening 25 which represents one o-f the sections of the cavity 3, already mentioned, in the end-piece 2. The opening 25 has a section 26 with a cylindrical wall in which a thread 27 is constructed for screwing in one of the pipes of the piping system. In the region of the central section 24, the wall 28 of the opening 25 tapers conically, the diameter of the narrowest point of this section 28 of the opening being intended to correspond to the inside diameter of the adjoined piping. The inclination of the wall 28 is relatively small such that the conical wall 28 of the cavity 3 continues in the inner section 22 of the end-piece.

Adjoining the central part 24 of the outer section 2 of the end-piece is the inner section 22 of the end-piece. This inner section 22 is essentially sleeve-shaped. The side wall 29 of the sleeve adjoins the wall of the central part 24 in such a way that the surface 28 of the cavity 3 is smooth. Mounted at the free end of the wall 29 of the sleeve is the base 30 of the sleeve 22. In the region directly adjoining the base 30, the wall 29 of the sleeve has a virtually cylindrical section 31 which represents the narrowest point of the cavity 3 in the end-piece 2. In the example illustrated in FIG. 1, the inside surface 34 of the base 30 is flat.

The outside of the base 30 of the sleeve is provided at least partially with a circumferential wall 32 which is virtually at right angles to the base 30. The inside dimension of the circumferential wall 32 is selected such that there is room for one of the end parts of the magnet arrangement 5 in the cavity bordered laterally by this wall 32. If the housing 10 for the magnets 7 is made of a plastic, the end parts of the housing 10 can be fitted directly in the cavity bordered laterally by the circumferential wall 32. However, if the magnet housing 10 is made of an electrically conducting material, such as copper for example, the inside of the cavity 32 is then lined with a padding 33 on which the end part 13 of the magnet arrangement 5 rests. This padding 33 is made of an electrically insulating material, advantageously of a plastic.

The outside of the side wall 29 of the sleeve 22 is provided with a circumferential shoulder 36. Consequently, the wall 29 of the sleeve has a wider section 37 and a narrower section 38. The wider section 37 of the wall of the sleeve adjoins the outer section 21 of the end-piece, more exactly the central part 24 of the latter. The outside diameter of the wider section 37 of the sleeve is virtually identical to the inside diameter of the jacket pipe 1, such that the section 37 of the sleeve is fitted in the jacket pipe 1 virtually without play. The narrower section 38 of the wall of the sleeve, which surrounds the base 30 of the sleeve already mentioned, has an outside diameter which is noticeably smaller than the inside diameter of the jacket pipe 1. Extending between the sections 37 and 38 of the sleeve is an annular surface 39 which is perpendicular to the outer wall of the said sections 37 and 38 of the sleeve and which connects these sections 37 and 38 in the region of the circumferential shoulder 36. The annular connecting surface 39 consequently forms the base of an annular interspace 40 which is bordered laterally by the outside of the smaller section 38 of the sleeve and by the inside of the jacket 1 and which extends between the annular surface 39 of the base and the base 30 of the sleeve 22.

Constructed in the region 31 of the wall 29 of the sleeve near to the base or immediately adjoining the base 30 of the sleeve 22 are channels 35 which connect the cavity 3 in the end-piece 2 with the gap 6 between the jacket 1 and the magnet arrangement 5 in terms of flow. The inner aperture 41 (FIG. 2) of each connection channel 35 is situated in the cylindrical section 31 of the wall 29 of the sleeve. The outer aperture 42 of the connection channel 35 is situated in the outside of the narrower section 38 of the sleeve such that this aperture 42 lies between the annular surface 39 on the sleeve 22 and the base 30 of the sleeve 29. Although the outer aperture 42 is pointed towards the inside of the jacket 1, in this region of the apparatus the outer wall of the sleeve 29 stands back at a distance from the inside of the jacket 1 by virtue of the annular surface 39 such that the channel 35 opens out into the annular interspace 40. The fluid passes through this interspace into the wider gap 6 of the apparatus.

The connection channels 35 are constructed and arranged in such a way that the fluid channels which pass through the connection channels 35 into the gap 6 at least partially have the shape of a helix, and that one section of each channel is situated between the corresponding sections of at least one second channel.

The end-piece 2 is provided at least with two connection channels 35 which, in the circumferential direction of the sleeve 22, are situated at equal distances from each other. The channels 35 lie expediently at the same level in respect of the longitudinal axis A of the apparatus (FIG. 1). If the end-piece 2 is provided with only two connection channels 35, these lie opposite each other as illustrated in FIG. 1. The angular distance between such channels 35 is 180 degrees. If there are three connection channels 35, they are then distributed along the wall 31 of the sleeve at equal distances from one another such that the annular distance between the adjacent connection channels is 120 degrees.

Figure 2:
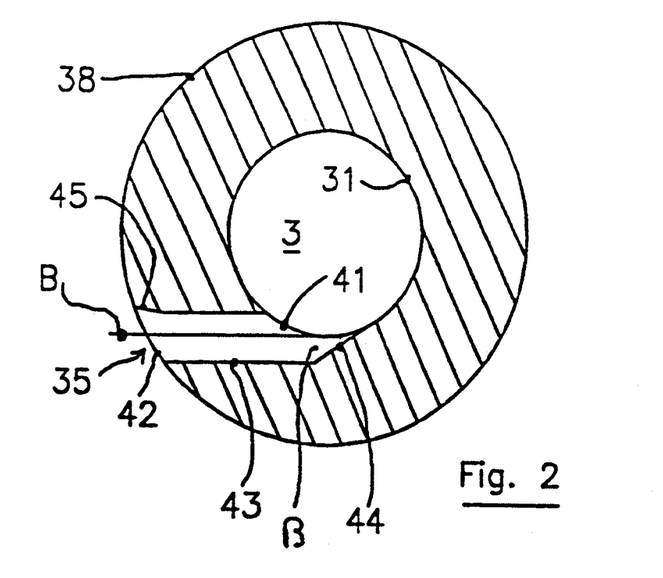
FIG. 2 shows a cross-section through an inner section of one of the end-pieces of the apparatus according to FIG. 1.

FIG. 2 illustrates a section through the wall 29 of the sleeve transverse to the longitudinal axis A of the apparatus. This section cuts through the connection channel 35, only one of these channels 35, however, being illustrated in FIG. 2. The main part 43 of the connection channel 35 extends in a straight line, the longitudinal axis B of this part 43 of the channel extending virtually tangentially to the contour of the cylindrical opening 31 in this section 38 of the sleeve 22. As can be seen in FIG. 1, the longitudinal axes B of the connection channels 35 lie in a plane which is perpendicular to the longitudinal axis A of the central cavity 3

In order to reduce turbulences of the fluid to a minimum in the region of the apertures 41 and 42 of the connection channel 35, sloping edges 44 and 45 are constructed in the apertures 41 and 42. In the case of the inner aperture 41, the sloping edge 44 is arranged on the outside of the longitudinal axis B of the channel This sloping edge 44 can be constructed as a flat section of the wall of the channel 35 which does not extend parallel to the longitudinal axis B of the channel 35. The angle beta enclosed by this section 44 of the wall and the longitudinal axis B of the channel can be, for example, 30 degrees In the case of the outer aperture. 42, the sloping edge 45 is situated in the region of the inner rim of the aperture 42. This sloping edge 45 can be constructed as a flat surface or also as a curved surface.

Figure 3:
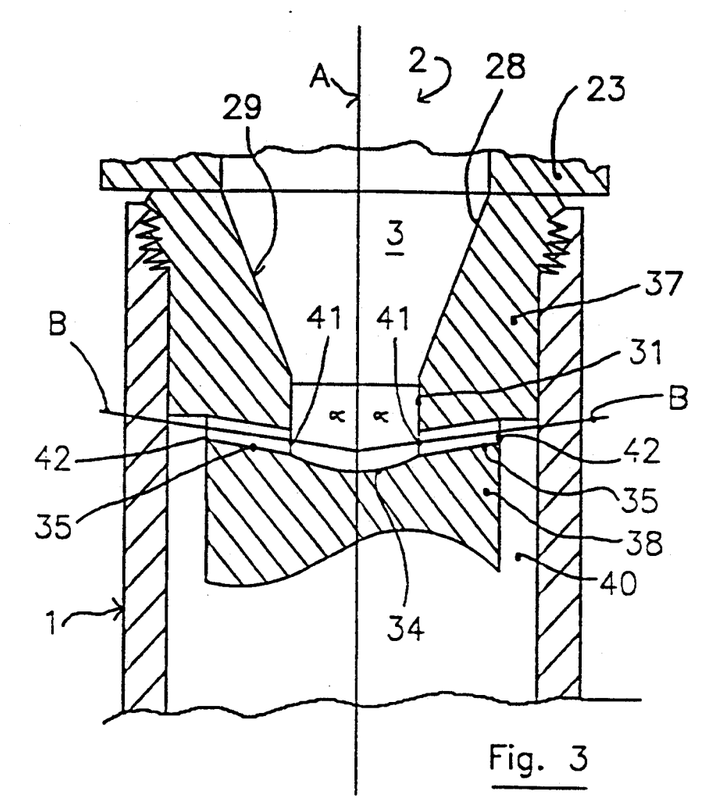
FIG. 3 shows a longitudinal section of a further embodiment of the end-piece mentioned.

FIG. 3 illustrates a further embodiment of the end-piece 2, in which an angle alpha, which is smaller than 90 degrees, is enclosed by the longitudinal axis B of each connection channel 35, and the longitudinal axis A of the apparatus. The axis B of each connection channel 35 extends obliquely in relation to a transverse plane to the longitudinal axis A of the apparatus in such a way that the aperture 41 of the connection channel 35, which is situated in the central cavity 3, is lower than that aperture 42 which is assigned to the annular interspace 40. Consequently, the channels 35 extend in a rising manner when considering the extent of the latter from the inner aperture 41 towards the outer aperture 42. The angle of inclination alpha of the connection channels 35 is advantageously between 81 and 89 degrees in relation to the longitudinal axis A of the central cavity 3. With this embodiment of the end-piece 2, the upper side 34 of the base 30 of the sleeve is curved outwards, which provides advantages in terms of flow on entry of the fluid into the connection channels 35.

Figure 4:
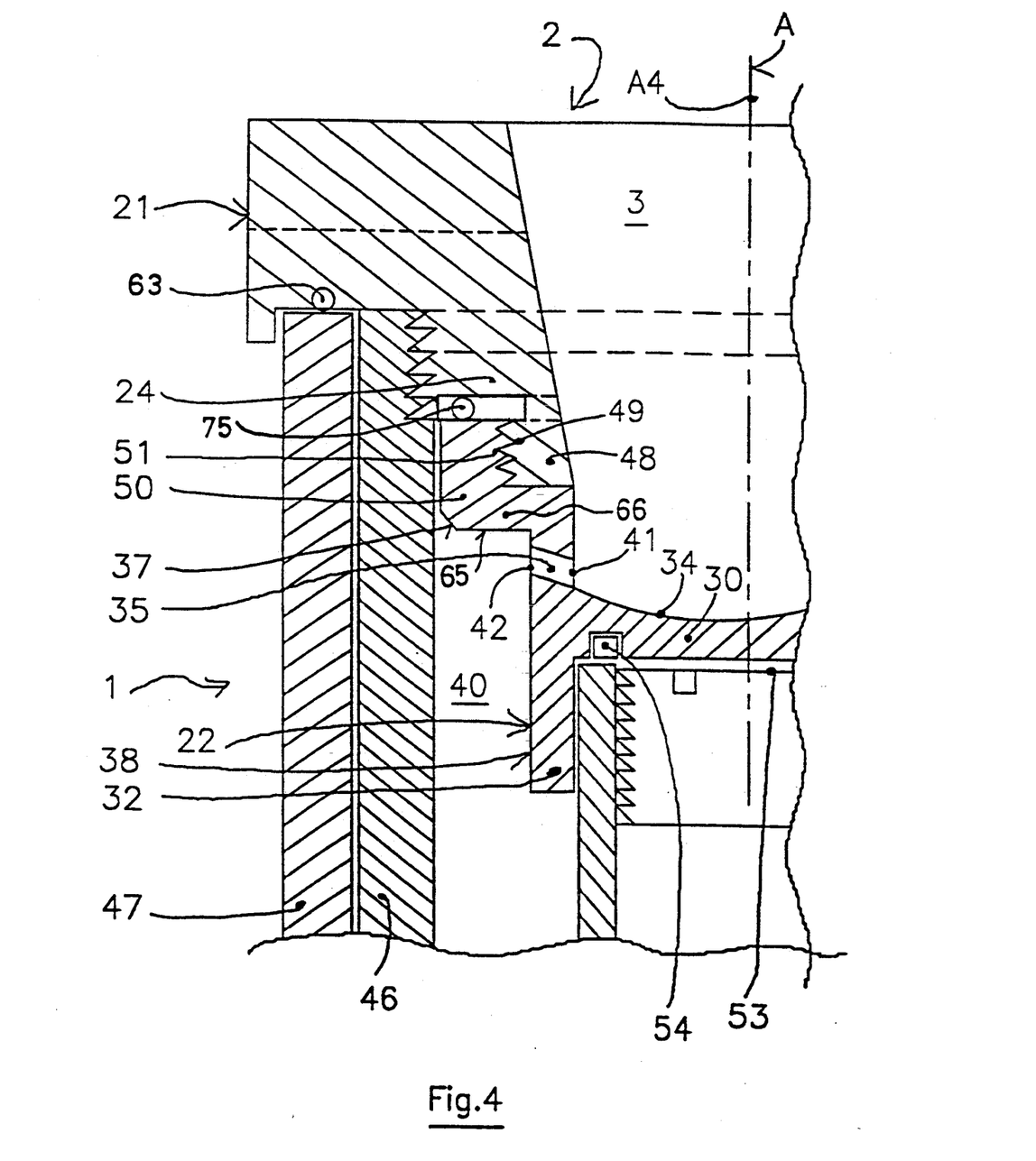
FIG. 4 shows a longitudinal section of a further example of the present apparatus.

FIG. 4 shows a vertical longitudinal section of an extract from a further embodiment of the present apparatus and, to be precise, only the left half of the latter. This apparatus is designed essentially the same as the apparatus according to FIG. 1. Differing from FIG. 1, the jacket 1 comprises two pipes 46 and 47, the one pipe 46 being inserted in the other pipe 47 without play. The inner pipe 46 is made of a soft magnetic material and it consequently corresponds to that pipe which represents the jacket 1 with the apparatus according to FIG. 1. The outer jacket pipe 47 is made of a material which is resistant, for example, to impacts, the surface of which can readily be treated, for example by coating with enamel, etc. With this construction of the jacket 1, the inside of the inner pipe 46 is also advantageously provided with the protective coating against rust attack already described above.

A further difference of this apparatus compared with the apparatus according to FIG. 1 concerns the design of the end-piece 2. In the present case, the end-piece 2 consists of two parts which correspond to the outer section 21 of the end-piece or the inner section 22 of the end-piece already described. These separate sections 21 and 22 are connected to each other to form the end-piece 2. For this purpose, a flange 48 shaped like a piece of pipe adjoins the front face of the central part 24 of the outer section 21, the outside of this flange 48 shaped like a piece of pipe being provided with a thread 49. The inside of the free edge part 50 of the sleeve 22 is likewise provided with a thread 51 and the inside diameter of this edge part 50 is dimensioned in such a way that the pipe flange 48 can be screwed into the edge part 50.

Adjoining the edge part 50 provided with the thread 51 is the wide section 37 of the sleeve. Constructed in the narrow section 38 of the sleeve are the connection channels 35 already described. The lower edge of the inner aperture 41 of the connection channel 35 adjoins the upper side 34 of the base 30, which results in a minimum resistance for the fluid when it flows into the channel 35. Constructed in the outside 53 of the base 30 of the sleeve are depressions 54 in which corresponding projections of one of the tools (not illustrated) can engage, which serve for screwing together the parts 21 and 22 of the end-piece.

It is understood that the two-part end-pieces 2 can also be used if the apparatus only has a simple jacket 1 which, for example, has been described in conjunction with FIG. 1 On the other hand, it is easily possible to use the double jacket (FIG. 4) in conjunction with the integrated end-piece.

In the previous paragraphs, the design of the end-pieces is described in conjunction with that part of the apparatus through which the fluid passes into the apparatus. It is understood that such an end-piece 2 can also be used in that region of the apparatus where the fluid leaves the apparatus. In such a case, the outer end section 21 of the outlet end-piece 2 is situated at the bottom. Consequently, the axes B of the connection channels 35 in the outlet end-piece 2 are inclined in such a way that the inner channel aperture 41 is higher than the outer channel aperture 42.

Figure 5:
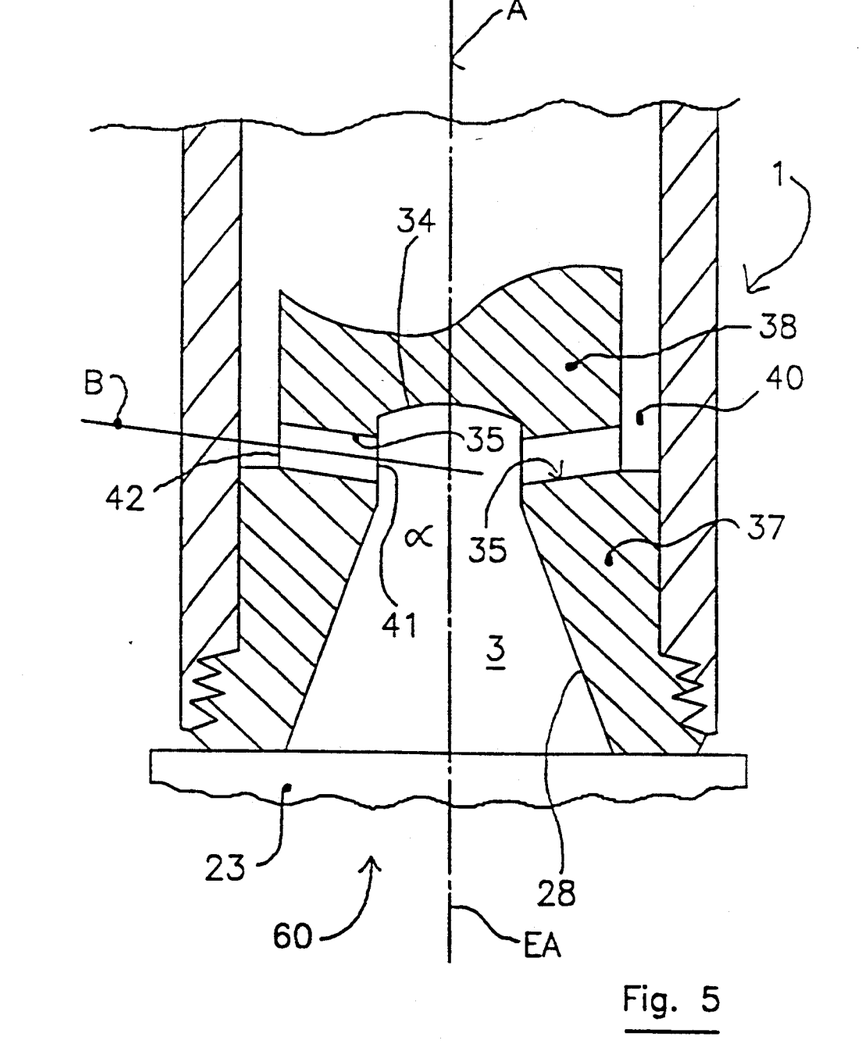
FIG. 5 shows a longitudinal section of an embodiment of that end-piece which is situated in the outlet region of the apparatus.

However it may also be expedient for the inclination of the connection channels in the outlet end-piece 2 to be matched to the direction of the discharge of fluid from the apparatus. Such an end-piece 60 is illustrated in FIG. 5, this end-piece 60 largely corresponding otherwise to the end-piece according to FIG. 3. With this outlet end-piece 60, the connection channel 35 is inclined in such a way that the outer aperture 42 of the latter is higher than the inner channel aperture 41. The consequence of this is that fluid, which is situated in the interspace 40, can flow off through the connection channel 35 into the cavity 3 merely under the effect of gravity. This measure enhances the drainage of the gap 6. The angle alpha enclosed by the axis B of the connection channel 35 and the end section EA of the axis A of the cavity is larger than 90 degrees and the size of this angle alpha is advantageously between 91 and 99 or 110 and 130 degrees.

Figure 6:
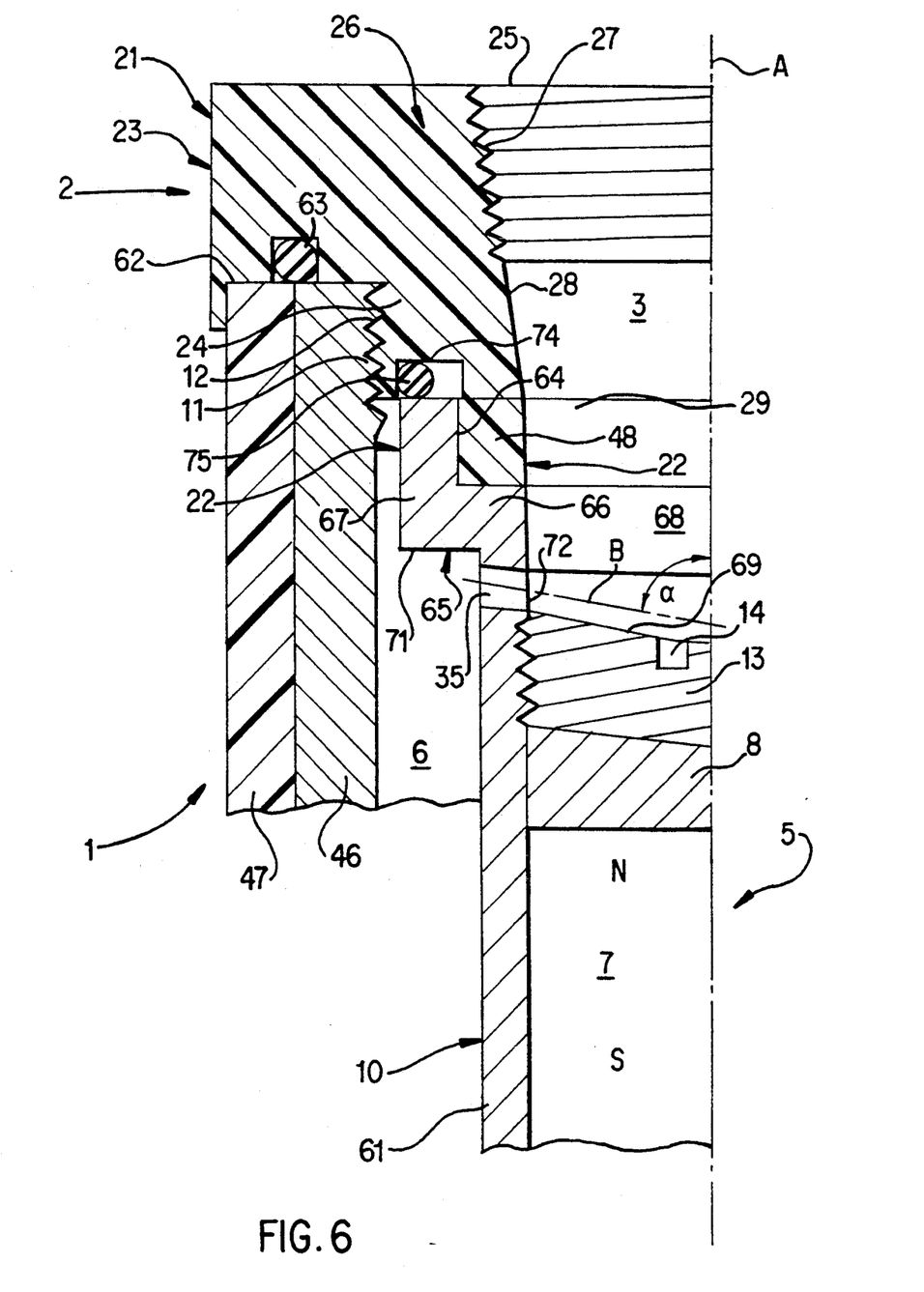
FIG. 6 shows a longitudinal section of one half of a further embodiment of one of the end-pieces of the present apparatus.

FIG. 6 shows one of the end parts of the present apparatus. This apparatus has the jacket 1 which is virtually tubular. This jacket 1 comprises a piece of pipe 46 which is made of a soft magnetic material. As an example of such material, stainless steel can be used. However, even this case, the inside of the jacket pipe 46 is advantageously provided with a protective coating which protects the jacket 1 from rust attack. Materials for such protective coatings are generally known and Berlacryl made by messrs. Berlac AG can be mentioned as an example of such material Furthermore, the jacket 1 can comprise a second, outer piece of pipe 47. This jacket pipe 47 is made of a material which is resistant, for example, to impacts, the surface of which can readily be treated, for example by coating with enamel, etc.

Situated at each end of the jacket 1 is an end-piece 2 which can be connected to the relevant end part of the jacket 1, closing the latter off. In the example illustrated, the inside of the piece of pipe 46 is provided with a thread 11 and the outside of the end-piece 2 with a corresponding thread 12. The end-piece 2 can consequently be screwed into the end part of the jacket 1, in particular of the piece of pipe 46. The end-pieces 2 which are screwed onto the ends of the jacket 1 can be of the same design.

The magnet arrangement 5 is furthermore surrounded by a tubular housing 10 which inter alia also comprises a piece of pipe 61. Situated in this piece of pipe 61 are the magnets 7 and the inserts 8 which are arranged successively and alternately. In the region of at least one of its end parts, the inner wall of the housing pipe 10 is provided with a thread in which a plug 13 is screwed. If only one end screw 13 is used, the other end of the housing pipe 10 can be closed off with a fixedly mounted base (not illustrated). The plug 13 is constructed as a stud screw (grub screw), the stud of the latter being provided with a slit 14 for the insertion of a screwdriver (not illustrated). One of the inserts 8 is also situated between the last one of the permanent magnets 7 and the end face of the end screw 13 or of the base 69 lying in the inside of the housing 10.

Constructed in the wall of the base, lying on the outside, of the outer edge part 23 of the outer section 21 of the end-piece is a circumferential groove 62. The width of this groove 62 is virtually identical to the thickness of the jacket 1 such that there is room for the latter in the groove 62 when the apparatus has been assembled. An annular ring 63 is placed in the groove 62 to improve the seal between the end-piece 2 and the jacket 1.

The outer wall of the central part 24 of the section 21 adjoining the said outer edge part 23 is set back in respect of the outer wall of the outer edge part 23 against the longitudinal axis A of the apparatus such that the central part 24 is narrower than the outer part 23 or has a smaller diameter that the latter. The outer wall of the central part 24 is provided with the thread 12, already mentioned, which enables the end-piece 2 to be screwed into the jacket pipe 1.

Constructed in the outer section 21 of the end-piece is a central opening 25 which represents one of the sections of the lateral boundary of the cavity 3, already mentioned, in the end-piece 2. The opening 25 has a section 26 with a cylindrical wall in which a thread 27 is constructed for screwing in one of the pipes of the piping system. In the region of the central section 24, the wall 28 of the cavity 3 tapers conically, the diameter of the narrowest point of this wall section 28 being intended to correspond to the inside diameter of the adjoined piping. The inclination of the wall 28 is relatively small such that the conical wall 28 of the cavity 3 continues in the inner section 22 of the end-piece.

Adjoining the central part 24 of the outer section 2 of the end-piece is the inner section 22 of the end-piece. This inner section 22 is essentially cylindrical. The inner wall 29 of such a sleeve adjoins the inner wall 28 of the central part 24.

As has already been mentioned, the housing 10 has a piece of pipe 61 in which the magnet arrangement 5 is situated. Furthermore, the housing 10 has at least one dish or can 65 which adjoins one of the ends of the piece of pipe 61. The dish 65 comprises a flat base 66 and a cylindrical side wall 67, one of the edge parties of this side wall 67 being integrated with the outer edge of the base 66. The dish 65 adjoins the piece of pipe 61 above the base 66 of the latter, a passage opening 68 being constructed in this base 66.

The inside diameter of the dish 65 is larger than the outside diameter of the piece of pipe 61. The inside diameter of the side wall 67 of the dish is virtually as large as or slightly larger than the outside diameter of the outside 64 of the inner section 22 of the end-piece such that there is room for the latter in the can or dish 65 when the apparatus is assembled The side wall 67 of the dish 65 consequently encloses or surrounds the inner section 22 of the end-piece 2. The diameter of the passage opening 68 in the base 65 of the dish is virtually the same as the inside diameter of the opening 29 in the inner section 22 of the end-piece such that the fluid can pass through both openings 29 and 68 into the piece of pipe 61 of the housing 10 without substantial turbulences being able to occur in the fluid in the process. The cavity 3 in the end-piece 2 is closed off on the inside by the upper side 69 of the screw 13 or of the side 70 of the base. This upper side 69 can be constructed to be lower such that the central part of the upper side 69 is lower than the edge part of the latter.

The edge part of the upper side 69 of the screw 13 or of the wall 70 of the base is lower than the lower side 71 of the base 66 of the dish 65 such that there is a short section 72 of the wall of the piece of pipe 61 between the upper side 69 and the lower side 71 of the base. Constructed in this wall section 72 are channels 35 through which the fluid can pass from the inside of the end-piece 2 into the annular gap 6 in the jacket 1 The connection channels 35 are constructed and arranged in such a way that the fluid channels which pass through the connection channels 35 into the gap 6 at least partially have the shape of a helix, and that one section of each channel is situated between the corresponding sections of at least one second channel The end-piece 2 is provided at least with two connection channels 35 which, even in the circumferential direction of the wall section 72, are situated at equal distances from each other. The longitudinal axis B of each connection channel 35 together with the longitudinal axis A of the apparatus forms an angle alpha which is smaller than 90 degrees.

Figure 7:
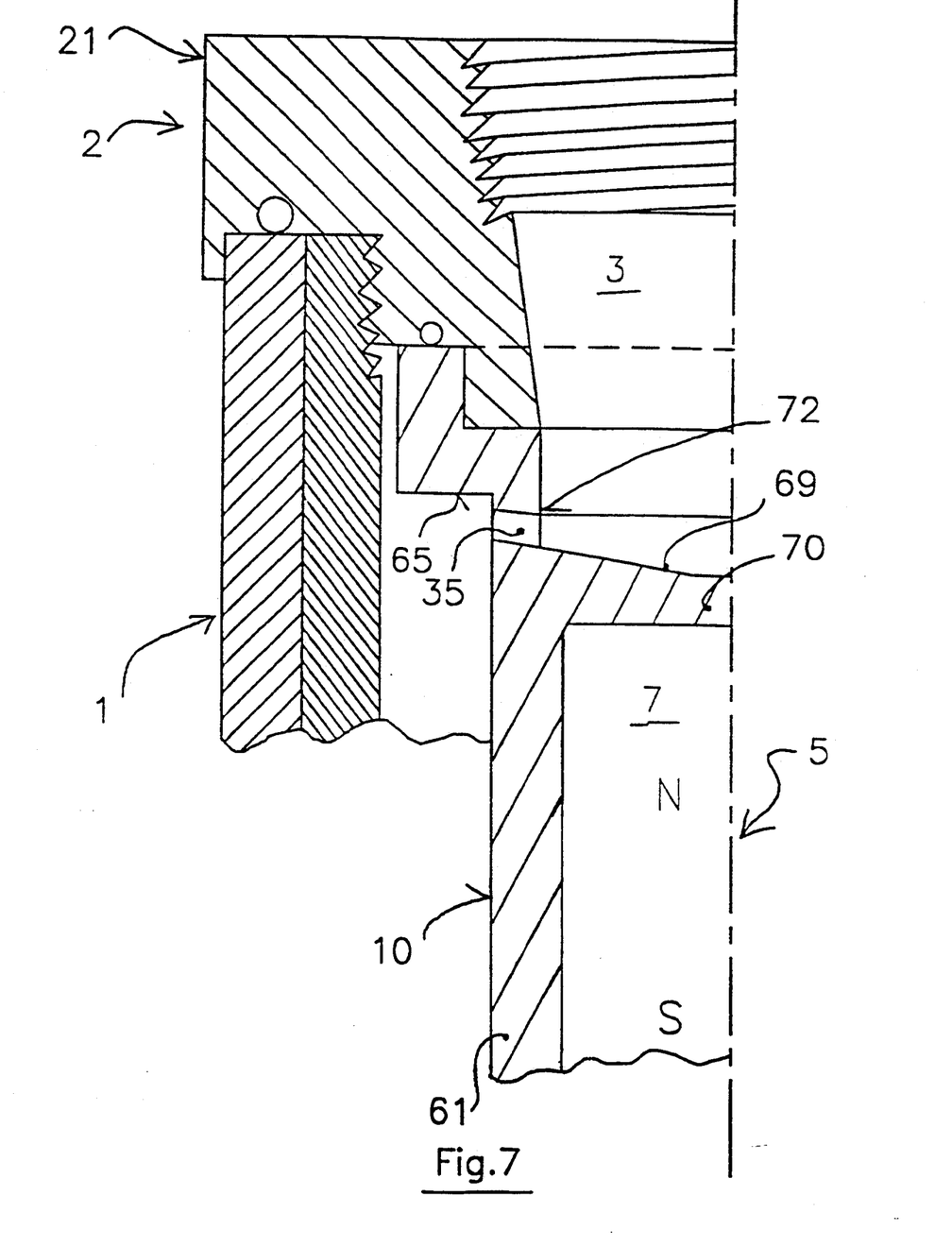
FIG. 7 shows a longitudinal section of one half of yet another embodiment of one of the end-pieces of the present apparatus.
Figure 8:
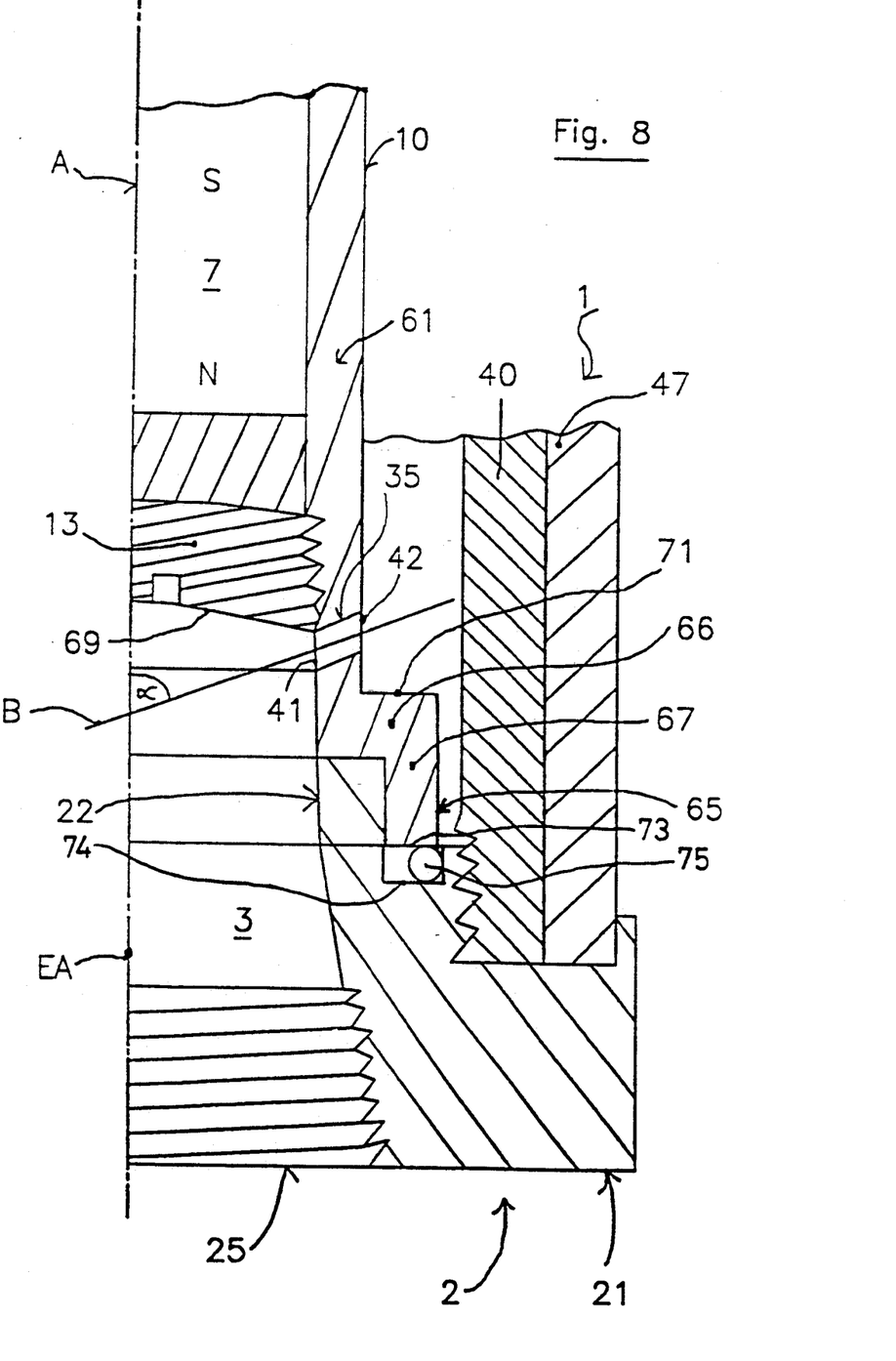
FIG. 8 shows a longitudinal section of one half of an outlet end-piece of the present apparatus which is applied in any case whenever the end-piece according to FIG. 7 is used as an inlet end-piece of the present apparatus or vice versa and FIG. 9 shows a longitudinal section of yet another example of the present apparatus.

One requirement may be that the housing 10 does not have a screw 13 in the region of the inlet end-piece 2. In such a case, this screw 13 is only situated in the region of the outlet end-piece 2 (FIG. 8). In such a case, the interior 3 in the region of the inlet end-piece 2 is closed off on the inside by the fixed wall 70 already mentioned (FIG. 7), which is situated in the inside of the piece of pipe 61 below the connection channels 35. The upper side 69 of this transverse wall is advantageously shaped the same as the upper side of the screw 13 in FIG. 6, the end-piece 2 according to FIG. 7 otherwise being the same as the end-piece 2 according to FIG. 6.

In the previous paragraphs, the design of the end-pieces has been described in conjunction with that part of the apparatus through which the fluid passes into the apparatus. It is understood that such an end-piece 2 can also be used in that region of the apparatus where the fluid leaves the apparatus. In such a case, the outlet end-piece 2 is arranged rotated by an angle of 180 degrees in relation to the inlet end-piece 2 as is indicated in FIG. 8. The outer end section 21 of such an outlet end-piece 2 is consequently situated at the bottom.

The end-piece 2 illustrated in FIG. 8 is essentially similar to the end-piece 2 according to FIG. 6. The only difference compared to the end-piece 2 according to FIG. 6 can be in the course of the connection channels 35. Seen in terms of flow, it is advantageous for the inclination of the connection channels 35 in the outlet end-piece 2 to be matched to the direction of the discharge of fluid from the gap 6. With this outlet end-piece 60, the connection channel 35 is inclined in such a way that the outer aperture 42 of the latter is higher than the inner channel aperture 41. The consequence of this is that fluid, which is situated in the gap 6, can flow off through the connection channel 35 into the cavity 3 merely under the effect of gravity. This measure enhances the drainage of the gap 6. The angle alpha enclosed by the axis B of the connection channel 35 and the end section EA of the axis A of the cavity is larger than 90 degrees and the size of this angle alpha is advantageously between 91 and 99 or 110 and 130 degrees The end-pieces 2 can advantageously be made of a plastic, such as for example of Teflon. The housing 10 can also be made of a plastic This enables these components 2 and 10 of the present apparatus to be manufactured at low cost.

The thickness of that wall 61 of the housing 10 in which the channel or the channels 35 are constructed can be between 2 and 15 mm, this thickness advantageously being 7 mm. For the thicker is the wall 61 of the piece of pipe 61 in the housing 10, the better can the course of the flow of fluid through the channels 35 be formed The dish or the pot 65 on the housing 10 is merely placed on top of the inner section 22 of the end-piece 2 such that the gap between these two parts 22 and 65 of the present apparatus cannot easily be ensured to be sufficiently tight for the fluid. In order to seal this gap, a sealing ring 75 is arranged between the end face 73 of the side wall 67 of the dish 65 and the opposite end face 74 on the end-piece 2.

Figure 9:
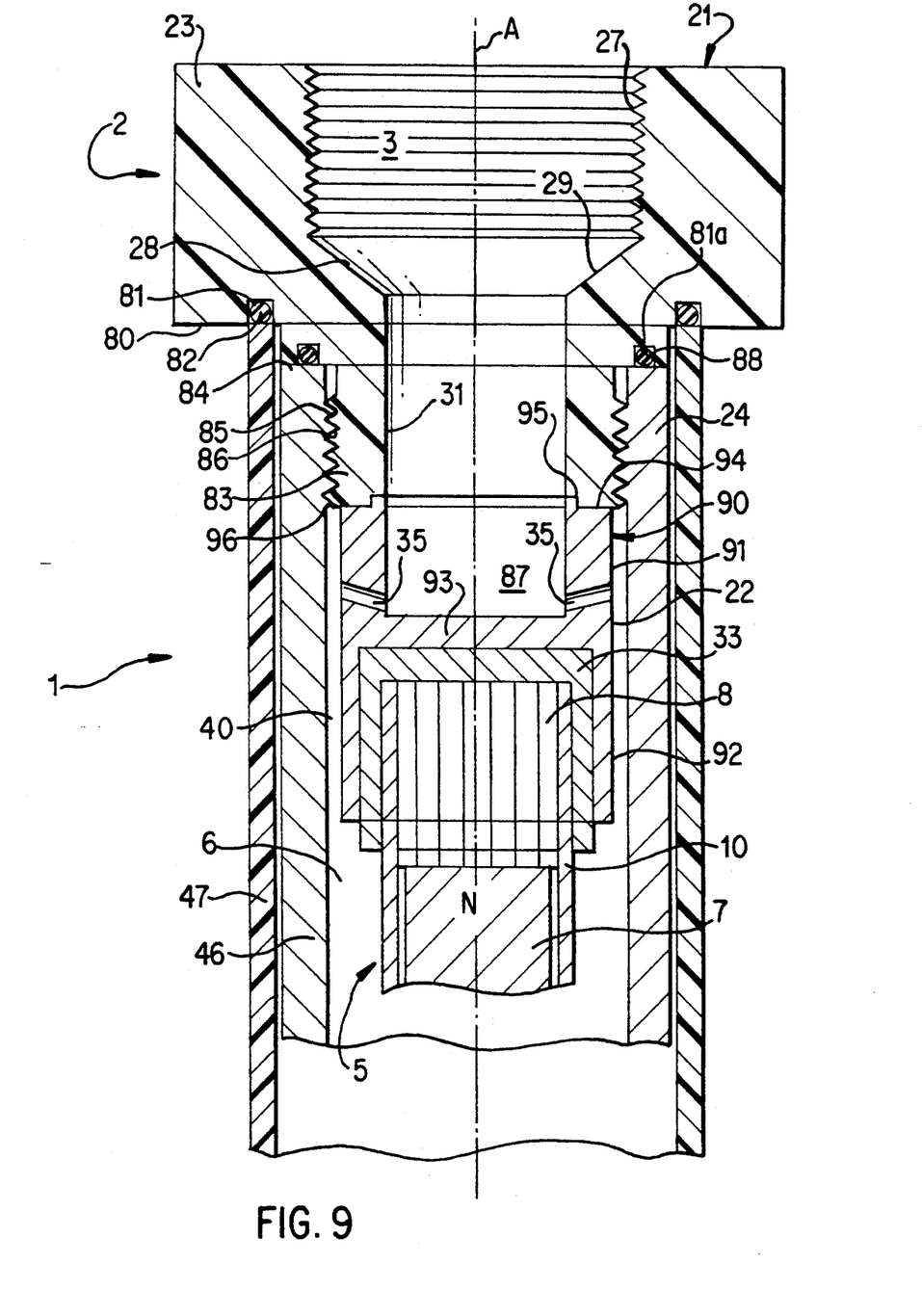

FIG. 9 shows a particularly advantageous embodiment of the present apparatus. This has an inlet end-piece 2, similar to the embodiments according to FIGS. 1 and 4. Said inlet end-piece 2 comprises an outer section 21 and an inner section 22. The outer edge part 23 of the outer end-piece section 21 is designed as a nut, advantageously as a hexagonal nut.

The outer wall of the central part 24 of the outer end-piece section 21 adjoining the outer edge part 23 is cylindrical and, in respect of the outer wall of the outer edge part 23 of said end-piece section, it is set back against the longitudinal axis A of the apparatus. Consequently, the central part 24 is narrower or it has a smaller diameter than the edge part 23. The outer wall of the central part 24 is surrounded by the end part of the pipe 47, already mentioned, made of a plastic or similar. Constructed in the basic surface 80 of the outer edge part 23 in the region of the end face of the insulating pipe 47 is a circumferential groove 81 in which a sealing ring 82 is sunk. The end face of the insulating pipe 47 rests on this sealing ring 82 when the apparatus is in the assembled state.

Adjoining the central part 24 of the outer end-piece section 2 is the inner end-piece section 22, the outer diameter of which is smaller than the diameter of the central part 24. Extending between the outer wall of the central part 24 and the outer wall of the inner section 22 there is thus a shoulder 84 which is essentially annular. This flat ring 84 lies virtually parallel to the basic surface 80 of the outer edge part 23. Constructed in the annular surface 84 is a further circumferential groove 81a in which a further sealing ring 88 is situated.

The pipe 46 made of a magnetizable material is situated in the interior of the insulating pipe 47, the end part of this pipe 46 surrounding the inner section 22 of the end piece 2 virtually completely. The inner section 22 is essentially tubular The outside of the wall 83 of the pipe piece 22 is provided with a thread 85. The inside of the end part of the metallic pipe 46 is provided with a corresponding thread 86 so that the end-piece 2 can be screwed into the metallic pipe 46 in order to keep the apparatus in the assembled state. In this case, the end face of this end part of the metallic pipe 46 rests on the second sealing ring 88.

Arranged between the magnet arrangement 5 and the end-piece 2 is an intermediate piece 90 This intermediate piece 90 is constructed as a two-sided sleeve. It has a first cylindrical wall 91 and a second cylindrical wall 92. A base 93, from which the sleeve walls 91 and 92 extend away, lies between these sleeve walls 91 and 92 or sleeve sections.

The end face 94 of the first sleeve wall 91 butts onto the end face of the end-piece inner section 22. In order that the position of these end faces is centered, a circumferential collar 95 is constructed in said end faces. As is illustrated in FIG. 9, the shoulders of this collar 95 can enclose a right angle. However, this angle can also be greater than 90 degrees so that the axially aligned shoulder 96 of the collar 95 extends obliquely in relation to the longitudinal axis A. This measure facilitates the assembly of the present apparatus The cavity 87 in the interior of the first sleeve part 91 joins the inside space 3 in the end-piece 2 seamlessly so that water can flow from the end-piece 2 into the interior 87 of the first sleeve section 91 in the intermediate piece 90. Constructed in the wall 91 of this first sleeve section are the channels 35, already described, which connect the inside space 87 in the first sleeve part 91 to the gap 6 of the apparatus in terms of flow.

Situated in the interior of the second sleeve section 92 is the padding 33, already mentioned, in which one of the end parts of the magnet arrangement 5 is embedded, as has been described in conjunction with FIG. 1. The diameter of this cavity is somewhat larger than the diameter of the cavity 87 in the first sleeve section 91 so that more space is available for the padding 33. The outer wall of the double sleeve 90 is smooth and cylindrical in order to achieve a throughflow of the water from the channels 35 into the gap 6 which is as unobstructed as possible.

It is obvious that the design described above can also be used for outlet end-piece, in which case the channels 35 are to be constructed in such a way as has been described above for the outlet end-pieces.

One of the essential advantages of this apparatus consists in the fact that there is far more freedom when constructing this apparatus corresponding to the respective requirements. This is the case because discrete components, such as end-piece, intermediate piece, magnet arrangement etc., are available, the design of which can be adapted better to the conditions of the respective application.

I claim:

1. An apparatus for the magnetic treatment of a liquid, comprising:
    an essentially cylindrical jacket having an inlet end and an outlet end;

a magnet arrangement, said magnet arrangement arranged longitudinally inside of said jacket and concentric with a longitudinal axis of said jacket such that there is a gap between the jacket and the magnet arrangement; and an inlet end-piece coupled to said inlet end and an outlet end-piece coupled to said outlet end so that the apparatus can be connected to a piping network, each end-piece including (1) a central cavity concentric with the longitudinal axis of said jacket and at least one channel fluidly connecting the central cavity to the gap, (2) an outer section disposed longitudinally away from the magnet arrangement and connectable to the piping network and the jacket, (3) an inner section disposed longitudinally toward the magnet arrangement and connectable thereto, wherein the outer section and the inner section of the end-piece are constructed as two independent components, and (4) means for releasable holding the outer section and the inner section f each end-piece together.

2. The apparatus of claim 1, wherein the outer section of the end-piece further comprises:

an outer edge-part disposed longitudinally away from the magnet arrangement, said outer edge-part having a peripheral wall;

a central part adjacent said outer edge-part and disposed longitudinally therefrom towards the magnet arrangement, said central part having a peripheral wall, the peripheral wall of said central part being recessed toward the longitudinal axis of the jacket with respect to the peripheral wall of the outer edge-part, and said peripheral wall of the central part is threaded and adapted to be screwed into a corresponding thread of one end-portion of the jacket; and a cylindrical flange adjoining said central part of the outer section and extending towards said magnet arrangement; and wherein the inner section of each end-piece comprises a portion with a flat base and a cylindrical side wall so that said flange is receivable therein.

3. The apparatus of claim 2, wherein said flange is provided with a thread and the cylindrical side wall of the inner section is provided with a thread such that the flange can be screwed into the inner section.

4. The apparatus of claim 2, wherein said flange is smooth, and the side wall of the inner section is smooth.

5. The apparatus of claim 4, wherein a middle region of a longitudinally inner portion of the central cavity of the end-piece is formed by a screw arranged such that said bottom can be flat or convex.

6. The apparatus of claim 4, wherein a middle region of a longitudinally inner portion of the central cavity of the end-piece is formed by a fixed wall which is either flat or convex.

7. The apparatus of claim 2, wherein the inner section of each end-piece includes one of said at least one channels, and wherein the cavity in the end-piece is closed off on the inside by a wall perpendicular to the longitudinal axis of the jacket, said at least one channel being located between said wall and said outer portion.

8. The apparatus of claim 1, wherein the outer section of the end-piece further comprises:

an outer edge-part disposed longitudinally away from the magnet arrangement, said outer edge-part having a peripheral wall; and a central part adjacent said outer edge-part and disposed longitudinally therefrom towards the magnet arrangement, said central part having a peripheral wall, the peripheral wall of said central part being recessed toward the longitudinal axis of the jacket with respect to the peripheral wall of the outer edge-part, and said peripheral wall of the central part is threaded and adapted to be screwed into a corresponding thread of one end-portion of the jacket; and wherein the inner section of each end-piece comprises:

a sleeve having a first cylindrical portion, a second cylindrical portion, and a base placed therebetween, wherein an end face of the first cylindrical portion is contiguous with an end face of the end-piece outer section, and wherein said at least one channel is formed in the first cylindrical portion, and wherein an end of the magnet arrangement is fitted within the second cylindrical portion.

9. The apparatus of claim 8, further comprising a circumferential collar disposed between the central part of the outer section and the first cylindrical portion of the inner section.

10. The apparatus of claim 8, further comprising a padding placed in the second cylindrical portion, wherein an end part of the magnet arrangement is embedded in said padding, and the diameter of a cavity formed within said second cylindrical portion is larger than the diameter of a cavity formed within said first cylindrical portion.

11. The apparatus of claim 8, wherein said channel extends tangentially towards a wall of the central cavity in the end-piece, and further comprising apertures disposed wherein the channel enters the central cavity and the gap, said apertures having chamfered edges.

12. The apparatus of claim 11, wherein said jacket surrounds a jacket pipe having a cylindrical end section which receives the inner section of the corresponding end-piece.

13. The apparatus of claim 11, wherein the sloping edges of the channels in the outlet end-piece are selected according to the direction of the discharge of fluid from the gap so that a radially outer aperture of the channel is located closer to said magnet arrangement than a radially inner aperture of said channel with respect to the longitudinal axis of said jacket.

14. The apparatus of claim 1, wherein the jacket comprises two pipes, wherein the first pipe is inserted in the second pipe, is made of a soft magnetic material, and has ends which are connected in a fluid-tight manner to the end-piece, and the second pipe is made of a material which is impact-resistant, and has a surface which can readily be treated.

15. The apparatus of claim 14, wherein the second pipe is coated with enamel.

16. The apparatus of claim 1, wherein the magnet arrangement further comprises a cylindrical housing arranged concentrically with the longitudinal axis of said jacket in which permanent magnets and inserts are successively and alternately arranged, at least one end of the housing being provided with a thread in which a plug is screwed, the other end of the housing being closed off with a fixedly mounted base, and wherein the respective end portion of the magnet arrangement is associated with one of the end-pieces of the jacket.

17. The apparatus of claim 1, wherein the inner section of each end-piece includes one of said at least one channels, a longitudinal axis of the channel lying in a plane which is perpendicular to a longitudinal axis of the central cavity or extending obliquely in relation to said plane such that the angle between the longitudinal axis of the channel and the longitudinal axis of the cavity differs from a right angle by 1 to 9 degrees.

18. The apparatus as claimed in claim 1, wherein the inner section of each end-piece includes said at least one channel, a longitudinal axis of the channel extending obliquely in the inlet end-piece, wherein the size of an angle of inclination alpha between a plane which is perpendicular to the longitudinal axis of the jacket and an axis of the channel is between 81 and 89 degrees.

19. The apparatus of claim 1, wherein the inner section of each end-piece includes one of said at least one channels, a longitudinal axis of the channel extending obliquely in the outlet end-piece, such tat the size of an angle of inclination alpha between an axis of the channel and an end section of the longitudinal axis of the jacket is between 110 and 130 degrees.

20. An apparatus for the magnetic treatment of a fluid comprising:
an essentially cylindrical jacket having an inlet end and an outlet end;
a magnet arrangement, said magnet arrangement arranged longitudinally inside of said jacket and concentric with a longitudinal axis of said jacket such that there is a gap between the jacket and the magnet arrangement; and
an end-piece coupled to each end of said jacket and said magnet arrangement via which said apparatus can be connected to a piping network, each of said end-pieces having a central cavity concentric with the longitudinal axis of said jacket and at least one channel which fluidly connects said central cavity to said gap, and each of said end-pieces further having an outer section disposed longitudinally away from the magnet arrangement and connectable to said jacket and the piping network and an inner section disposed longitudinally toward the magnet arrangement and connectable thereto, wherein a borehole is formed in said outer section, said inner section is essentially sleeve-shaped and has a base, and an edge of said inner section which borders an opening of said inner section joins the outer section such that an inner wall of the central cavity in said sleeve-shaped inner section adjoins an inner wall of said bore-hole in said outer section, means for releasably holding the outer section and the inner section of each end piece together, and wherein said at least one channel is formed in said sleeve shaped inner section adjacent said base, and a longitudinal axis of said at least one channel extends obliquely relative to a plane oriented perpendicularly to a longitudinal axis of said jacket such that an angle between the longitudinal axis of the channel and said plane differs from a right angle by 1 to 9 degrees.

* * * * *